March 25, 1958 F. POKORNY 2,828,461
CONTACT TRANSFORMER WITH TWO PARALLEL CONTACT SYSTEMS
Filed Dec. 23, 1954
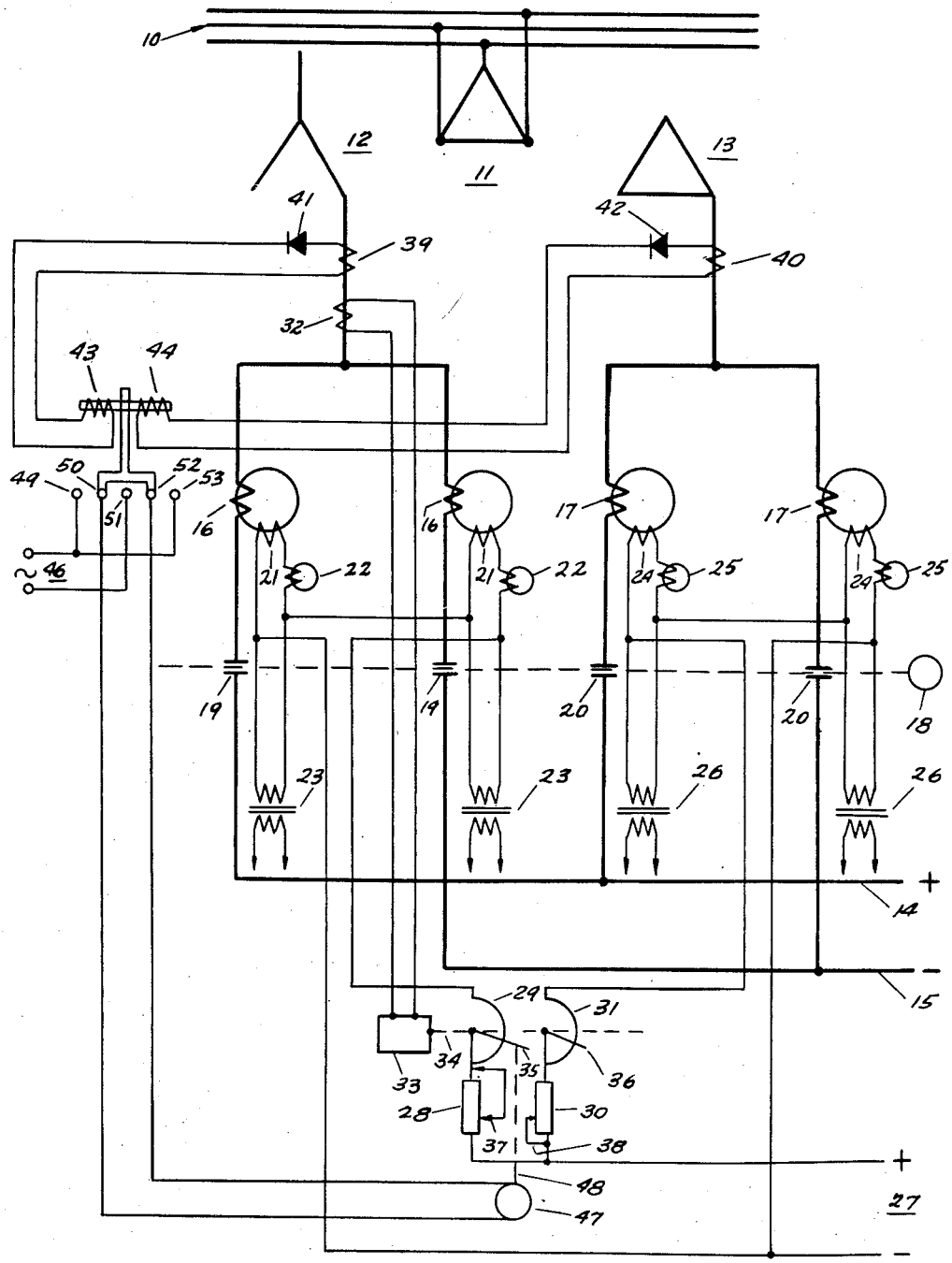
INVENTOR.
FRITZ POKORNY
BY
*Ostrolenk & Faber*
ATTORNEYS

United States Patent Office

2,828,461
Patented Mar. 25, 1958

2,828,461

CONTACT TRANSFORMER WITH TWO PARALLEL CONTACT SYSTEMS

Fritz Pokorny, Erlangen, Germany, assignor to Siemens-Schuckertwerke A. G., Berlin, Germany, a corporation of Germany Application December 23, 1954, Serial No. 477,320

8 Claims. (Cl. 321—48)

My invention relates to mechanical rectifiers and is more particularly directed to a method to allow controlled load distribution between parallel connected mechanical rectifiers in which voltage regulation is achieved by magnetic control. Mechanical rectifiers utilizing magnetic control for voltage regulation are disclosed in copending application Serial No. 423,358, filed April 15, 1954, assigned to the assignee of the instant invention.

My novel device will allow controlled load distribution between two such rectifiers shown in the above copending application when the two units are connected in parallel. I accomplish this by measuring the current in each rectifier and bring the difference to zero or a small value by varying the flux-reversal of each commutating reactor, thus varying the output voltage of each system.

In general, mechanical rectifiers convert A.-C. power to D.-C. power as follows:

An alternating potential is impressed across a contact and series connected load. This contact is opened and closed in synchronism with the impressed alternating potential. When the alternating potential is in the direction desired for the load potential, the contact is closed and the input alternating potential falls across the load. When the alternating potential subsequently reverses, the contact is opened and the alternating potential then falls across the open contact. Hence, by opening and closing the contacts in synchronism with the input alternating potential, a unidirectional potential can be impressed on the load.

In order to provide a low-current step in which the contact can be repeatedly opened and closed, a commutating reactor is placed in series with the contact. Commutating reactors have a core material made of a high permeability material and their construction and operation are clearly described in United States Patent No. 2,693,569, issued to Edward J. Diebold, November 2, 1954, and assigned to the assignee of the instant application.

When the communtating reactor is unsaturated, it limits the current through the contact to approximately one thousandth of its peak value. Hence when the contact is closed, to allow the alternating potential to fall across the load, the commutating reactor unsaturates and limits the inrush current to the value of its magnetizing current until the commutating reactor saturates. After the commutating reactor saturates, the current rises to a value given by the impedance of the load and rectifying system. When the alternating potential reverses, the load current decreases to zero current, the commutating reactor unsaturates once again and a low current step is provided in which the contact can be safely opened.

Magnetic voltage control as described in above mentioned co-pending application Serial No. 423,358, filed April 15, 1954, can now be incorporated into this circuit. After the contact closes to allow the alternating potential to fall across the load, it falls acros the extremely high impedance of the commutating reactor instead. Therefore, the potential which should fall across the load, does not appear there until the commutating reactor saturates. It is now obvious that by varying the period of unsaturation of the commutating reactor during the make interval, the voltage falling across the load is varied. This type voltage control is herein called magnetic control.

The degree of unsaturation of the commutating reactor for magnetic control can be achieved by a predetermined amount of flux reversal of the commutating reactor prior to the time the contact is closed. Hence, if the commutating reactor flux is not reversed prior to contact closure, the alternating potential after contact closure will fall on the commutating reactor until the flux is completely reversed. Therefore, a minimum voltage, will fall on the load. If however, the commutating reactor is completely reversed prior to contact closure, the alternating potential after contact closure will immediately fall across the load. Therefore, a maximum voltage will fall on the load if the commutating reactor flux is completely reversed prior to contact closure.

Thus it is clear, that a circuit controlling the degree of unsaturation of the commutating reactor prior to contact closure effects magnetic voltage control of the rectifier. The above description can be easily extended to include multiple phase systems in which the alternating potential is derived from transformers of various well known connections.

It is frequently desirable to achieve a given load current capacity by putting two or more rectifiers of lower current capacity in parallel. However, when two units having the same rating are put in parallel, experience shows that one unit will carry a much larger portion of the total load current than the other unit carries. Furthermore, this load distribution varies depending upon the amount of magnetic voltage control employed.

This difference in load distribution comes about due to a difference in the inherent impedance of the two units. Even though the two units are similar in rating and construction, small differences in total impedance are unavoidable. Furthermore, when currents of the magnitude of 5000 amperes per unit are being carried, an extremely small difference in impedance between paralleled units can result in a seriously unbalanced load condition.

In the case of two 5000 ampere rated rectifiers feeding a total load of 10,000 amperes, a current distribution of 8,000 amperes for one rectifier and 2,000 amperes for the second rectifier have been observed. This difference in current distribution was due to a small difference in the impedance of two similar rectifiers.

This disadvantage can be overcome by individually adjusting the magnetic voltage control of each unit. The output voltage difference between the parallel units can then overcome the impedance difference between the units. Hence an equal load distribution can be achieved.

However, this balanced condition is valid for only one value of total load current. When the output voltage of the parallel rectifiers is varied to achieve a different total load current, the impedance of the two individual rectifiers will be different, and an unbalanced load distribution is present once again. It is now necessary to make an adjustment in the output voltage of the units to again achieve equal load distribution between the two parallel rectifiers.

My invention is directed to a novel means for automatically adjusting the output voltage of each parallel unit individually to maintain equal load distribution between the parallel units under any operating condition. I achieve this result by measuring the load current in each system and using the difference between the two measurements to actuate a change in the flux reversal circuit of each rectifier, thus varying the magnetic voltage control. This change will be in a direction to make the measured difference smaller. As soon as there is a zero difference or a predetermined small difference between the current in each system, the flux reversal in each unit remains constant. Hence an automatic load distribution for parallel connection is achieved with my novel invention.

Accordingly, it is a primary object of my invention to provide a novel means to maintain a given load distribution between paralleled mechanical rectifiers utilizing magnetic voltage control, regardless of any operating condition of the rectifiers.

Another object of my invention is to provide a difference measurement of the current in two parallel mechanical rectifiers and bring the difference measurement to zero by varying the flux reversal of the commutating reactors of each unit.

Another object of my invention is to provide an automatic adjustment of the load distribution of two parallel mechanical rectifiers by varying the flux reversal of the commutating reactors with a first rough control and a second fine control.

A still further object of my invention is to adjust the load distribution of two paralleled mechanical rectifiers by automatically and simultaneously decreasing the current of the rectifier carrying higher current and increasing the current of the rectifier carrying lower current until the difference is zero or some small predetermined difference.

My novel invention could also be applied to electromagnetically operated mechanical rectifiers in which the output voltage is controlled by a by-pass circuit transductor or by commutating reactor flux reversal. This type electromagnetic rectifier is disclosed in co-pending application filed February 24, 1954, Serial No. 412,165, and assigned to the assignee of the instant application.

These and other objects of my invention will become apparent when taken in conjunction with the drawing in which the figure is a schematic drawing of two parallel connected mechanical rectifiers using magnetic voltage control. For the purpose of simplification, only one phase of each rectifier is shown. The extension of the figure to three phase operation will be obvious to anyone skilled in the art. The choice of a transformer secondary connected in Y and delta is purely arbitrary and my invention can be applied to any type connection of mechanical or electromagnetic rectifiers utilizing magnetic voltage control.

In the figure, A.-C. power source 10 energizes the rectifier transformer 11. The secondary side of the rectifier transformer 11 has a Y connection 12 which energizes one six phase rectifier system and a delta connection 13 which energizes a second six phase rectifier system. For the purpose of simplicity, only two phases of each six phase rectifier 12 and 13 is shown. The output of these two rectifier systems 12 and 13 are then connected in parallel to feed a common D.-C. bus system shown as 14 and 15. Y connected rectifier 12 has commutating reactors 16 and delta connected rectifier 13 has commutating reactors 17. A synchronous motor 18, drives the contacts 19 of rectifier system 12 and the contacts 20 of rectifier system 13. Note that the two contact systems 19 and 20 in the rectifiers of this particular embodiment are contained in the same mechanism. However, my novel invention would still be applicable to completely isolated mechanical rectifiers having individual contact systems and individual primary A.-C. excitation.

The flux reversal circuits controlling the flux of the commutating reactors 16 and 17 thus affecting voltage control is partially shown as windings 21, transductor 22 and voltage source 23 for unit 12 and winding 24, transductor 25 and voltage source 26 for the parallel unit 13. A constant voltage D.-C. bias is supplied in parallel to the flux reversal circuits of both rectifiers 12 and 13 from source 27. Varying the magnitude of this D.-C. bias current, varying the flux reversal of the commutating reactors 16 and 17, hence output voltage control is achieved. This type of flux reversal circuit is completely described in above-mentioned co-pending application, Serial No. 423,358, filed April 15, 1954, assigned to the assignee of the instant invention.

In series with each D.-C. bias circuit are two variable resistors, resistors 28 and 29 for unit 12 and resistors 30 and 31 in unit 13. My invention is directed towards the automatic control of these series resistors in such a way as to maintain a given load current distribution between the two parallel rectifiers 12 and 13. That is, I provide automatic control of the flux reversal current of each rectifier system 12 and 13, in such a way that the output voltage of each rectifier system will compensate for impedance differences between the two systems thus maintaining a predetermined load distribution between the two rectifier systems.

Variable resistors 29 and 31 provide the rough control for the D.-C. bias current to their respective flux reversal circuits. That is, variable resistors 29 and 31 adjust the D.-C. bias currents for the flux reversal circuits to their approximate value. One method of controlling variable resistors 29 and 31 is as follows. The secondary current of unit 12 which is a function of the output current is measured by means of current transformer 32. The voltage appearing on the current transformer 32 is then applied to a servo-mechanism in which the input voltage controls the angular position of an output shaft. Such servo-mechanisms are well known and I show one schematically as box 33. The output shaft 34 of servo-mechanism 33, whose angular position is proportional to the input voltage of current transformer 32, is shown as controlling the contact arms 35 and 36 of variable resistors 29 and 31. Therefore, the series resistance of the flux reversal D.-C. bias circuits is roughly controlled to give the approximately correct D.-C. bias current for a given output load current.

Fine control of the individual flux reversal D.-C. bias currents of rectifier units 12 and 13 is accomplished by means of variable resistors 28 and 30 respectively. By controlling the position of contact arms 37 and 38 of variable resistors 28 and 30, the resistance in one flux reversal D.-C. bias circuit will increase and the resistance in the other flux reversal D.-C. bias circuit will increase. Hence the flux reversal D.-C. bias current will increase in one circuit and decrease in the other when the position of contact arms 37 and 38 of variable resistors 28 and 30 is changed.

The position of arms 37 and 38 are controlled by a measured difference in the output load current of rectifier units 12 and 13. When one rectifier unit supplies a load current higher than some predetermined value, then the other unit will carry a load current lower than its predetermined value since the total output current is some constant value to be supplied by both units 12 and 13. The measured load difference between the two units is then used to vary the resistance of variable resistors 28 and 30. Hence the flux reversal D.-C. bias current of units 12 and 13 will vary in such a way as to lower the output voltage of the units carrying the higher load current and increase the output voltage of the unit carrying the lower load current. The load currents of the two units 12 and 13 will then be brought back to their predetermined values. At this point, the measured difference in load current distribution between units 12 and 13 will be zero and the value of the individual flux reversal D.-C. bias currents will remain at this value since the signal to change the resistance of variable resistors 28 and 30 is zero.

A circuit that will measure the difference in a predetermined load balance condition, and bring this difference to zero by changing the resistance of resistor 28 and 30 according to the above description is as follows:

A measure of the load current carried by each unit 12 and 13 is made by the current transformers 39 and 40 respectively. The measured currents are then rectified by rectifier 41 and 42 and compared in coils 43 and 44 of relay 45. According to a first or second position of relay 45 an auxiliary voltage source 46 will energize motor 47 for clockwise rotation or counterclockwise rotation and a third relay position will disconnect the voltage source 46 from the motor 47. The position of contact arms 37 and 38 of variable resistors is then controlled by a shaft driven by motor 47.

Thus for example, when the load current carried by units 12 and 13 is distributed correctly, coils 43 and 44 will maintain the relay 45 in the open position as shown in the drawing where motor 47 is disconnected from the voltage source 46. Hence, the resistance of variable resistors 28 and 30 is fixed. If, however, unit 12 carries a greater load current than some predetermined value, then coil 43 would overcome 44 thus engaging relay contacts 49—50 and 51—52. Hence, motor 47 rotates in a direction given by the phasing of voltage 46, to change the resistance of variable resistors 28 and 38 in such a way as to bring the load distribution back to its predetermined value. As soon as this balance is achieved, relay contacts 49—50 and 51—52 will disengage, thus deenergizing motor 47 and fixing the resistance of variable resistors 28 and 39. Hence the flux reversal D.-C. bias currents will now be maintained at the new value found to achieve the predetermined load balance.

The system works in a similar fashion if rectifier unit 13 carries more than its share of a predetermined load. In this case, however, relay contacts 50—51 and 52—53 will engage. Thus the motor 47 will rotate in an opposite direction to that of the case of unit 12 being overloaded and the value of resistors 28 and 30 will change accordingly in order to bring about proper load current balance.

In summary, I achieve a predetermined load balance between two paralleled mechanical rectifiers by measuring the output current of each system by means of current transformers 39 and 40. I then compare these two measurements in relay 45. If the measurement shows that unit 12 carries too much current the flux reversal D.-C. bias current in unit 12 is changed to decrease its output current and the flux reversal D.-C. bias current in unit 13 is changed to increase its load current. One way of effecting this D.-C. bias current change is by means of a reversible motor 47 which is responsive to the position of relay 45, driving variable resistors 28 and 30. Thus when the flux reversal D.-C. bias current is increased one system it will be decreased in the other since one resistor will have an increased value and the other will have a decreased value. As soon as the predetermined load balance is achieved, relay 45 will open and the perspective flux reversal D.-C. bias currents of each rectifier unit will remain at the newly determined value.

If on comparing the load currents of the two rectifier units 12 and 13 is found that unit 13 is carrying too high a current, a similar process occurs as occurred when unit 12 was over-loaded. In this case, however, motor 47 will rotate in the opposite direction and the values of variable resistors will change accordingly.

It should be noted that my invention could be carried out by any means of D.-C. bias current variation. For example, the same result could be achieved by using two D.-C. supply circuits shown in Figure 1 as voltage supply 27, and varying the input voltage to the flux reversal circuits in a way similar to the way the circuit resistance was changed.

In the foregoing, I have described my invention only in connection with a preferred embodiment. Many variations and modifications of the principle of my invention within the scope of the description herein are obvious.

Accordingly, I prefer to be bound not by the specific disclosure herein but only by the appending claims.

I claim:

1. In a device to maintain a predetermined load distribution between parallel operated mechanical rectifiers having flux reversal circuits; said flux reversal circuits having a D.-C. bias; a variable impedance to control said D.-C. bias of each of said flux reversal circuits, a first means to measure the load current carried by each of said mechanical rectifiers, a second means to compare said measured load currents, said second means to cause variation of said variable impedance until said load currents reach said predetermined distribution.

2. In a device to maintain a predetermined load distribution between two mechanical rectifiers operated in parallel, each of said two mechanical rectifiers having a flux reversal circuit, the D.-C. bias of each of said flux reversal circuits having a first and second variable resistor therein to vary said D.-C. bias current, a first means to adjust the resistance of each of said first variable resistors to allow the approximately correct flow of said D.-C. bias current, a second means to individually adjust the resistance of each of said second resistors, said second means constructed to be activated when said load distribution between said two mechanical rectifiers is not at said predetermined value.

3. A device to maintain a predetermined load distribution between two mechanical rectifiers operated in parallel, each of said two mechanical rectifiers having a flux reversal circuit, the D.-C. bias of each of said flux reversal circuits having adjustable resistance therein to vary the current of said D.-C. bias, a first and second means to measure the load current of said first and second mechanical rectifier, a three position relay, said first and second measured load currents compared in said three position relay, said three position relay constructed to be in a first position when said measured load current in one of said two mechanical rectifiers is higher than a predetermined value and in a second position when said measured load current in said one of said two mechanical rectifiers is lower than a predetermined value, said relay to be in a third position when said measured load current is at its predetermined value; a third means to vary said adjustable resistance in one direction when said relay is in said first position and in the other direction when said relay is in said second position and to keep the variable resistance constant when said relay is in said third position.

4. A device to maintain a predetermined load distribution between two mechanical rectifiers operated in parallel, each of said two mechanical rectifiers having a flux reversal circuit, the D.-C. bias of each of said flux reversal circuits having adjustable resistance therein to vary the current of said D.-C. bias, a first current transformer to measure the primary current of said first mechanical rectifier, a second current transformer to measure the primary current of said second mechanical rectifier, the output currents of said first and said second current transformers compared by a three position relay, said three position relay constructed to be in a first position when said measured load current in one of said two mechanical rectifiers is higher than a predetermined and in a second position when said measured load current in said last mentioned mechanical rectifier is lower than a predetermined value, said relay to be in a third position when said measured load current is at its predetermined value; means to vary said adjustable resistance in one direction when said relay is in said first position and in the other direction when said relay is in said second position and to keep said variable resistance constant when said relay is in said third position.

5. In a device to maintain a predetermined load distribution between two parallel connected mechanical rectifiers in which output voltage control is achieved by the D.-C. bias of a saturable reactor, a D.-C. bias control circuit for each of said two mechanical rectifiers, the current of each of said D.-C. bias control circuits controlled by a first and second variable resistance, a first means to control said first variable resistance of each of said D.-C. bias control circuit, a second means to control said second variable resistor of each of said D.-C. bias control circuits, said first means being a device constructed to obtain a rough measure of the output load current of said two mechanical rectifiers and adjust said first variable resistor of each of said D.-C. bias control circuits in accordance with said rough measurement, said second means being a device to measure the difference from a predetermined value in load current carried by each of said two mechanical rectifiers and to then vary said second variable resistors of each of said two mechanical rectifiers, thereby varying the output current of each of said mechanical rectifiers until said measured difference is at some predetermined value.

6. In a device to maintain a predetermined load distribution between two parallel connected mechanical rectifiers in which output voltage control is achieved by the D.-C. bias of a saturable reactor; a D.-C. bias control circuit for each of said two mechanical rectifiers, a first means to vary the D.-C. bias current controlling each of said two mechanical rectifiers, a second means to measure and compare the output current of each of said two mechanical rectifiers, said second means connected to activate a third means in accordance with the measured difference between the load currents in said two mechanical rectifiers to individually vary said first means to bring said measured difference between the load currents in said two mechanical rectifiers to said predetermined value by varying said D.-C. bias current controlling each mechanical rectifier.

7. In a device to maintain a predetermined load distribution between parallel operated rectifiers having saturable reactors for output voltage control, a first means to vary flux reversal of said saturable reactor, a second means to measure the load current carried by each of said rectifiers, a third means constructed to compare said measured load current and cause variation of said flux reversal of said saturable reactor by varying said first means responsive to said compared measurement, said variation to be in a direction to bring said load current to said predetermined load distribution.

8. In a device to maintain a predetermined load distribution between two parallel connected rectifiers in which output voltage control is achieved by the D.-C. bias of a saturable reactor, a D.-C. bias control circuit for each of said two rectifiers, the current of each of said D.-C. bias control circuits controlled by a first and second variable resistance, a first means to control said first variable resistance of each of said D.-C. bias control circuit, a second means to control said second variable resistor of each of said D.-C. bias control circuit, said first means being a device constructed to obtain a rough measure of the output load current of said two rectifiers and adjust said first variable resistor of each of said D.-C. bias control circuits in accordance with said rough measurement, said second means being a device to measure the difference from a predetermined value in load current carried by each of said two rectifiers and to then vary said second variable resistors of each of said two rectifiers, thereby varying the output current of each of said rectifiers until said measured difference is at some predetermined value.

References Cited in the file of this patent
UNITED STATES PATENTS

| | | |
|---|---|---|
| 1,654,937 | Knight | Jan. 3, 1928 |
| 1,661,841 | McDonald | Mar. 6, 1928 |
| 2,137,098 | Schilling | Nov. 15, 1938 |
| 2,181,152 | Rolf | Nov. 28, 1939 |
| 2,199,121 | Walsh | Apr. 30, 1940 |
| 2,340,098 | Zuhlke | Jan. 25, 1944 |